(12) United States Patent
Yoshida et al.

(10) Patent No.: US 7,854,807 B2
(45) Date of Patent: Dec. 21, 2010

(54) MAGNETIC METAL POWDER SUITABLE FOR USE IN MAGNETIC RECORDING MEDIA AND METHOD OF MANUFACTURING THE POWDER

(75) Inventors: Takayuki Yoshida, Okayama (JP);
Masatoshi Nakayama, Okayama (JP);
Ryota Igarashi, Okayama (JP)

(73) Assignee: Dowa Electronics Materials Co., Ltd., Tokyo (JP)

( * ) Notice: Subject to any disclaimer, the term of this patent is extended or adjusted under 35 U.S.C. 154(b) by 647 days.

(21) Appl. No.: 11/727,482

(22) Filed: Mar. 27, 2007

(65) Prior Publication Data
US 2007/0227302 A1    Oct. 4, 2007

(30) Foreign Application Priority Data
Mar. 28, 2006  (JP) .............................. 2006-086906
Sep. 26, 2006  (JP) .............................. 2006-261531

(51) Int. Cl.
*H01F 1/147*  (2006.01)
*H01F 1/20*   (2006.01)

(52) U.S. Cl. ........................ 148/309; 148/307; 428/403

(58) Field of Classification Search ....................... None
See application file for complete search history.

(56) References Cited

U.S. PATENT DOCUMENTS 5,922,454 A * 7/1999 Inaba et al. .............. 428/840.6

| 6,149,989 | A  | * | 11/2000 | Araki et al. ............... 428/842.3 |
| 6,627,313 | B2 | * | 9/2003  | Uegami et al. ............... 428/402 |
| 7,074,281 | B2 | * | 7/2006  | Matsumoto et al. ......... 148/311 |
| 2007/0059557 | A1 | * | 3/2007 | Shoji et al. ............... 428/692.1 |
| 2007/0087229 | A1 | * | 4/2007 | Konno et al. ............. 428/842.3 |

FOREIGN PATENT DOCUMENTS

| JP | 6-215360    | 8/1994  |
| JP | 7-22224     | 1/1995  |
| JP | 7-78331     | 3/1995  |
| JP | 7-184629    | 7/1995  |
| JP | 3043785     | 3/2000  |
| JP | 2003-242624 | 8/2003  |
| JP | 2003-296915 | 10/2003 |
| JP | 2005-101582 | 4/2005  |
| JP | 2005-259929 | 9/2005  |

* cited by examiner

*Primary Examiner*—John P Sheehan
(74) *Attorney, Agent, or Firm*—Clark & Brody

(57) ABSTRACT

A metal magnetic powder for a magnetic recording medium is provided whose particles have a metal magnetic phase, composed mainly of Fe or Fe plus Co, and an oxide layer, wherein the average major axis length of the powder particles is 10-50 nm, the average particle volume including the oxide layer is 5,000 nm$^3$ or less, the atomic ratio (R+Al+Si)/(Fe+Co) calculated using the content values (at. %) of the elements contained in the powder particles is 20% or less, where R is rare earth element (Y being treated as a rare earth element). The metal magnetic powder is obtained by using a complexing agent and a reducing agent to elute nonmagnetic constituents after firing. The metal magnetic powder exhibits a large saturation magnetization σs for its particle volume while maintaining weatherability comparable to the conventional level and is suitable for a coated-type magnetic recording medium.

11 Claims, 3 Drawing Sheets

MAGNETIC METAL POWDER SUITABLE FOR USE IN MAGNETIC RECORDING MEDIA AND METHOD OF MANUFACTURING THE POWDER

FIELD OF THE INVENTION

This invention relates to a ferromagnetic metal powder for use in coated-type magnetic recording media and a method of manufacturing the powder.

BACKGROUND ART

Magnetic recording media, typically those used for backing up computer data, require enhanced recording density to meet increasing storage capacity requirements. A magnetic powder of small particle volume is considered necessary for achieving high recording density. Assignee has responded to these circumstances by establishing the manufacturing method set out in Patent Document No. 1 shown below and developing various other improvements in metal magnetic powder production technology.

As can also be seen in the literature published heretofore, the main constituent of metal magnetic powders is typically iron. Industrial manufacture of iron-system metal magnetic powder is generally carried out by the method of incorporating a sintering inhibitor such as Si, Al, rare earth element or an alkaline earth metal element into an acicular powder comprised mainly of iron oxy-hydroxide or iron oxide and then reducing the powder.

Earlier attempts to enhance magnetic powder properties have focused mainly on how to improve the properties of the magnetic powder itself and on how to prevent sintering and thus improve dispersibility. Patent Documents Nos. 2 to 5 define the atomic ratio of rare earth element and the like on the particle surface and teach that magnetic recording media excellent in electromagnetic conversion characteristics can be obtained by using magnetic particles falling with the defined ranges. Of particular interest is Patent Document No. 5, which defines the amount of sintering inhibitor per unit surface area and teaches that inclusion of sintering inhibitor at or greater than the prescribed value is necessary to prevent particle adhesion and enhance dispersibility, and thereby improve the magnetic properties and surface properties of the magnetic recording medium.

In order to boost the recording density of a magnetic recording medium, it is necessary to increase the number of magnetic particles included per unit volume and therefore necessary to reduce particle size. Patent Document Nos. 7 and 8, for example, teach use of a magnetic powder whose particles are reduced to the finest possible. The particle-size refining method used is generally to carry out particle-size refinement at the stage of the starting material (precursor) for synthesizing magnetic particles by firing and reduction. However, when the refined precursor is subjected to firing and reduction, the likelihood of inter-particle sintering, axial ratio degradation owing to particle shape deterioration, and other such problems tends to increase. This has made it necessary to include a large amount of sintering inhibitor in the precursor.

However, the rare earth element, Al and Si used as sintering inhibitors are nonmagnetic, so that increasing the relative content of these "nonmagnetic constituents" per unit volume of the magnetic powder lowers the saturation magnetization. As explained above, the need to increase the amount of sintering inhibitor arises particularly when the particle size of the magnetic powder is refined, so that there has been a problem of the saturation magnetization being markedly degraded owing to increase in the amount of sintering inhibitor per unit volume. Further, Patent Document No. 9 teaches a method of increasing dispersibility by subjecting the magnetic particles to compression deaeration for decoupling the bonds caused by sintering and inter-particle action.

On the other hand, reduction of particle volume (size) by refinement generally lowers saturation magnetization. One reason that can be given for this is that the particle surface needs to be formed with an oxide layer of a certain thickness for maintaining the weatherability of the magnetic powder, so that the percentage of particle volume accounted for by the metal component decreases with higher particle-size refinement. An effective way to improve the magnetic properties of a metal magnetic powder is to increase the percentage of the volume accounted for by the metal portion, i.e., the magnetized portion, and this has been a common avenue of approach in the past. However, the method employed focuses on regulating the thickness of the oxide layer, and in this case a problem remains in that weatherability is degraded owing to the fact that the relative thickness of the oxide layer diminishes.

Patent Document No. 1: JPA-07-022224
Patent Document No. 2: JPA-06-215360
Patent Document No. 3: JPA-07-078331
Patent Document No. 4: JPA-07-184629
Patent Document No. 5: JPA-2003-296915
Patent Document No. 6: JPA-2005-101582
Patent Document No. 7: JPA-2003-242624
Patent Document No. 8: JPA-2005-259929
Patent Document No. 9: Japanese Patent No. 3043785

OBJECT OF THE INVENTION

As pointed out in the foregoing, when magnetic powder particle-size refinement is attempted, a problem of adverse effect on magnetic properties tends to arise owing to a relative increase in the amount of added sintering inhibitor and a relative increase in the amount of oxide layer required for maintaining weatherability. This problem is very difficult to overcome by a direct method of reducing the amount of added sintering inhibitor and/or reducing the thickness of the oxide layer.

Moreover, realization of better tape orientation requires dispersibility enhancement through sinter prevention. However, pursuit of a higher level of particle-size refinement makes sintering more likely to occur owing to the resulting increase in the surface area of the magnetic powder. A particularly notable finding that emerged from recent studies by the inventors is that while a certain degree of sinter prevention effect can be realized by inhibiting inter-particle sintering by use of a method like that set out in Patent Document No. 5, it is difficult to achieve total prevention of inter-particle sintering simply by increasing the amount of sintering inhibitor, especially in the case of a magnetic powder comprising fine particles of a particle diameter of 100 nm or less. In addition, dispersibility is degraded by the presence of large particle clusters formed by sintering, giving rise to a problem of tape orientation property degradation, while the increase in the amount of sintering inhibitor raises the nonmagnetic constituent content, thus reducing the magnetic constituent content per unit volume of the magnetic powder and causing a problem of Br (residual magnetic flux density) decrease at the time of tape-making.

A method such as that set out in Patent Document No. 9 of breaking up clusters by compression has a problem in that it degrades magnetic properties by applying damage-causing mechanical pressure to the magnetic particles. This method was determined to be disadvantageous because the tendency to cause damage is particularly pronounced in the case of a magnetic powder comprising fine particles of a particle diameter of 100 nm or less. To be more specific, although past experience demonstrates that a magnetic powder comprising fine particles of a particle diameter of 100 nm or less requires reduction of nonmagnetic sintering inhibitor content and improvement of dispersibility, it is further true that reducing sintering inhibitor content promotes sintering between the particles and that this tendency is more pronounced for fine particles. Therefore, the conventional practice has if anything been to increase the amount of added sintering inhibitor with increasing particle-size refinement and it has not been readily possible to reduce the amount of added sintering inhibitor, i.e., to adopt what would be an ideal method.

It is worth noting that the sintering inhibitor is added to the starting material before firing for the purpose of sinter prevention during firing and high-temperature reduction and has no further role to play at the stage where it is present in the metal magnetic powder synthesized by the firing and high-temperature reduction. Therefore, if instead of reducing the amount of added sintering inhibitor it should be possible to remove the "nonmagnetic constituents" originating from the sintering inhibitor and present in the metal magnetic powder, it would be possible to increase the relative content of the metal portion, i.e., the magnetized portion, while also achieving sinter prevention, and thereby inhibit decease of saturation magnetization with particle-size refinement. Further, one cause of adhesion of dirt for magnetic head when using a coated-type magnetic recording media is thought to be sintering inhibitor-originating components present on the particle surfaces, so removal of the nonmagnetic constituents would also be an effective measure from this viewpoint.

In addition, the sintering inhibitor segregates near the surface of the magnetic powder. The heat during firing and reduction fuses the sintering inhibitor to cause adhesion (necking) of the sintering inhibitor components at the individual particle surfaces and the magnetic particles form clusters as a result. Since removal of the sintering inhibitor near the surface would therefore minimize necking and decrease particle cluster formation, the magnetic powder could be expected to exhibit improved dispersibility in a binder.

However, effective removal of only sintering inhibitor-originating nonmagnetic constituents from the particles of the metal magnetic powder is not necessarily easy and no method for this purpose has been established heretofore.

In the light of this situation, the object of the present invention is to provide a technology for removing from the particles of a metal magnetic powder nonmagnetic constituents originating from, sintering inhibitor that has fulfilled its purpose, by this provide a metal magnetic powder that exhibits a large saturation magnetization σs ($Am^2/kg$) for its particle volume while maintaining weatherability comparable to the conventional level and is suitable for a coated-type magnetic recording medium, and provide a coated-type magnetic recording medium using the metal magnetic powder.

SUMMARY OF THE INVENTION

The foregoing object is achieved by a metal magnetic powder for a magnetic recording medium whose particles have a metal magnetic phase, composed mainly of Fe or Fe plus Co, and an oxide layer, wherein the average major axis length of the powder particles is 10-50 nm, the average particle volume including the oxide layer is 5,000 $nm^3$ or less, the atomic ratio (R+Al+Si)/(Fe+Co) calculated using the percentage of content (at. %) of the elements contained in the powder particles is 20% or less, and the content of the nonmagnetic constituents is preferably not greater than 40 $\mu mol/m^2$ per unit surface area of the powder.

"Atomic ratio (R+Al+Si)/(Fe+Co) is 20% or less" means that the following Formula (2):

$$(R+Al+Si)/(Fe+Co) \times 100 \leq 20 \qquad (2)$$

is satisfied when each element symbol is replaced with the content of the corresponding element expressed in at. %. R represents rare earth element (Y being treated as a rare earth element). Rare earth element, Al and Si need not all be contained. If an element is not contained, the corresponding element symbol in Formula (2) is replaced with zero.

Rare earth element (Y being treated as a rare earth element), Al and Si are called nonmagnetic constituents and "the content of the nonmagnetic constituents is not greater than 40 $\mu mol/m^2$ per unit surface area of the powder" means that the following Formula (3) is satisfied.

$$[\text{Total number of mols of R+Al+Si per gram of powder}] (\mu mol/g)/[\text{Powder BET specific surface area}] (m^2/g) \leq 40 \qquad (3)$$

The metal magnetic powder according to the present invention meets the following relationship when its pore size distribution is measured by the mercury penetration method. The relationship is such that the cumulative volume of pores in the region where the pore size is larger than the average major axis length of the power is, for instance, 1.0 mL/g or less. The "cumulative volume of pores in a region where the pore diameter is larger than the average major axis length of the powder" is called the "cumulative inter-particle void space" in this specification.

Moreover, the metal magnetic powder satisfies, for example, the relationship of Formula (1) between saturation magnetization σs ($Am^2/kg$) and average particle volume including the oxide layer V ($nm^3$):

$$\sigma s \geq 0.0185V + 58 \qquad (1).$$

The metal magnetic powder is preferably one whose rate of decrease in saturation magnetization Δσs when held for 1 week (168 h) in an atmosphere of a temperature of 60° C. and humidity of 90% RH is 15% or less.

The rate of decrease in saturation magnetization Δσs, which is an index used to evaluate magnetic powder weatherability, is defined by the following Formula (4):

$$\Delta\sigma s\ (\%) = (\sigma s(i) - \sigma s(ii))/(\sigma s(i)) \times 100 \qquad (4),$$

where σs(i) is the saturation magnetization ($Am^2/kg$) before holding in the aforesaid atmosphere and σs(ii) is the saturation magnetization ($Am^2/kg$) after holding for 168 h in the aforesaid atmosphere.

Such a metal magnetic powder can be produced by subjecting the aforesaid metal magnetic powder containing nonmagnetic constituents, in its state after firing or after both firing and high-temperature reduction, to a process using a complexing agent and a reducing agent in combination to elute the nonmagnetic constituents into a solution. More specifically, the present invention provides a method of manufacturing a magnetic metal powder for use in magnetic recording media comprising a step (elution process) carried out on a metal magnetic powder including particles having a metal magnetic phase composed mainly of Fe or Fe plus Co and containing one or more said nonmagnetic constituents, in which step a reducing agent acts in a solution added with a complexing agent capable of forming a complex with one or more of said nonmagnetic constituents to elute nonmagnetic constituents from the powder particles into the solution. A step for forming an oxide layer on the surfaces of the powder particles (oxidation process) is preferably conducted after the elution process.

As the complexing agent can be used, for example, one or both of disodium tartrate and sodium citrate. As the reducing agent can be used, for example, one or more of hydrazine ($N_2H_2$), lithium aluminum hydride ($LiAlH_4$), sodium boron hydride ($NaBH_4$), and derivatives thereof.

The present invention enables an increase in the relative content of the metal element(s), i.e., the magnetized portion, while also achieving sinter prevention, not by reducing the amount of added sintering inhibitor in the manufacture of a metal magnetic powder, but by means of eluting from fired and high-temperature-reduced metal magnetic powder nonmagnetic constituents originating from sintering inhibitor that has completed its role. As a result, the present invention provides a metal magnetic powder in which decrease of saturation magnetization with particle-size refinement is markedly inhibited and which exhibits higher saturation magnetization than conventional metal magnetic powders for its particle size. Since sintering inhibitor is markedly removed from the particle surfaces, inter-particle bonds (necking) attributable to the sintering inhibitor decouple to improve dispersibility. Further, no decline in weatherability or other such harmful effect arises because decrease in saturation magnetization with particle-size refinement is inhibited even without implementing a measure such as making the oxide layer especially thin. The present invention is therefore capable of responding to the recent ever more demanding need for enhanced high-recording density and weatherability (increased assurance of saturation magnetization being maintained at a high level) in coated-type magnetic recording media.

DESCRIPTION OF THE PREFERRED EMBODIMENTS

Metal Magnetic Powder

Figure 1:
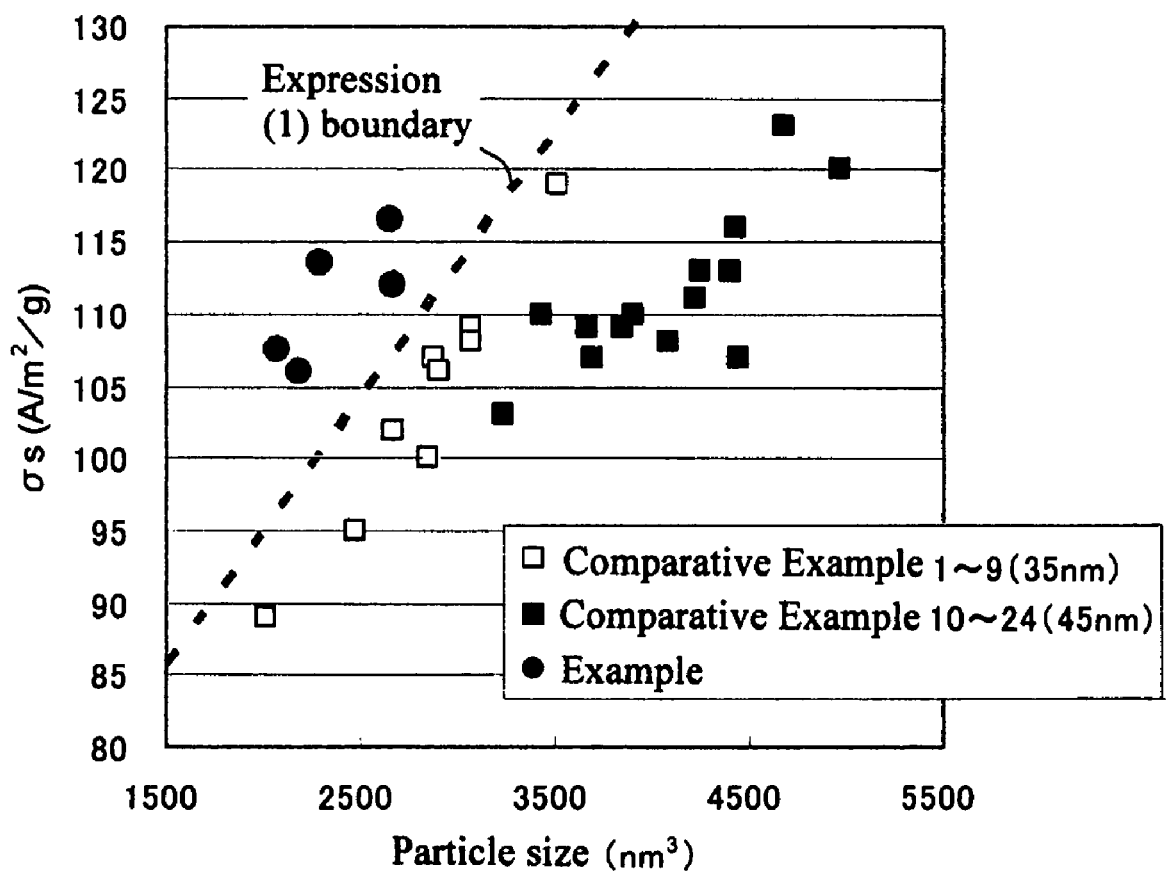
FIG. 1 is graph showing how saturation magnetization σs varied as a function of average particle volume V in metal magnetic powders obtained in Examples and Comparative Examples.

The magnetic powder that is the subject of this invention is a metal magnetic powder whose particles have a metal magnetic phase composed mainly of Fe or Fe plus Co. More specifically, Fe or Fe plus Co account for 50 atomic % or greater of the magnetic elements (Fe, Co and Ni) constituting the metal magnetic phase. The powder particle surfaces are coated with an oxide layer and the mol ratios among the elements present in the whole particle including the oxide layer and the metal magnetic phase are such that the ratio of Co to Fe (hereinafter called the Co/Fe atomic ratio) is 0-50 at. %. The Co/Fe atomic ratio is expressed as [Co content (at. %)/Fe content (at. %)×100]. The powder preferably has a Co/Fe atomic ratio of 5-45 at. %, more preferably 10-40 at. %. Within these ranges, stable magnetic properties can be readily obtained and the weatherability is also good. Although iron oxide is found in the oxide layer, it is acceptable for oxides of other elements to be present as well.

The "nonmagnetic constituent(s)" of rare earth element (Y being treated as a rare earth element), Al, Si or other are added as sintering inhibitor in the manufacturing process. However, since these nonmagnetic constituents are eluted from the metal magnetic powder by a method set out later in accordance with the present invention, the atomic ratio (R+Al+Si)/(Fe+Co) is kept to 20 at. % or less. That is, Formula (2) set out earlier is satisfied. At this time, a powder is afforded that has a larger saturation magnetization for its particle size than conventional particle-size-refined metal magnetic powders. Atomic ratio (R+Al+Si)/(Fe+Co) is more preferably 15 at. % or less, still more preferably 13 at. % or less or 12 at. % or less.

The elements constituting the powder particles are not limited to Fe, Co, Ni, rare earth element (Y being treated as a rare earth element), Al, Si and O but may, for example, include alkaline earth metal element added as sintering inhibitor and various other elements. The composition of the powder of this invention includes Fe, Co, Ni, rare earth element (Y being treated as a rare earth element), Al, Si and O, and the balance of unavoidable impurities.

The range of acceptable content of nonmagnetic constituents originating from sintering inhibitor is preferably defined based on the powder surface area. Specifically, the nonmagnetic constituent content is preferably not greater than 40 $\mu mol/m^2$ per unit surface area of the powder, i.e., the nonmagnetic constituent content is preferably limited so as to satisfy Formula(3) set out above. When the nonmagnetic constituent content increases to exceed this range, the saturation magnetization of the metal magnetic powder tends to decrease and this in turn tends to degrade the C/N ratio of the magnetic recording medium. The total content of rare earth element, Al, Si and "X constituents" (herein X is defined as constituent elements other than Fe, Co, Ni, rare earth element (Y being treated as a rare earth element), Al, Si and O) is very preferably limited to not greater than 40 $\mu mol/m^2$, still more preferably to not greater than 30 $\mu mol/m^2$, per unit surface area of the powder.

The powder of this invention is composed of particles of a size such that the average major axis length is 10-50 nm and average particle volume is 5,000 $nm^3$ or less, preferably 4,500 $nm^3$ or less. At a larger particle size, magnetic tape recording density is difficult to enhance to an adequately high level. The longest diameter of a particle image observed in a transmission electron micrograph is defined as the major axis length as termed with respect to this invention. On the other hand, when the photographically observed particle image is elliptical or circular (when the ratio of the diameter of the longer portion (major diameter) to the diameter of the shorter portion (minor diameter) is around 1~2, the length of the longest sectional diameter is defined as the major axis length for the purpose at hand.

Thanks to the mitigation of inter-particle necking, the particles according to this invention are characterized in having a cumulative inter-particle void space of less than 1.0 mL/g. The "cumulative inter-particle void space" as termed here is a value representing the sum of the pore volumes in the region where the pore size is larger than the average major axis length, when the pore size distribution was measured by the mercury penetration method. To be more specific, what is measured as the pore size in the region where the pore diameter is smaller than the average major axis length is those of the pores present on the particle surface itself, while what is measured in the region where the pore diameter is larger than the average major axis length represents those of void space resulting from overlapping and adhesion of the particles.

The "average major axis length" is the average of the major axis lengths of individual particles (at least 300 particles) measured from the aforesaid transmission electron micrograph.

Therefore, the reason for there being much void space in the region where the pore diameter is larger than the average major axis length is that there is a lot of inter-particle necking and a high probability of cluster formation. Such clusters degrade packing at the time of medium-making and by extension are likely to lead to degradation of magnetic recording medium properties (increase in particulate noise and degradation of squareness ratio and other orientation properties). Although this means that a smaller amount of void space is better, the inventors found that it is desirable for the cumulative inter-particle void space to be less than 1.0 mL/g, more preferably less than 0.9 mL/g, still more preferably less than 0.8 mL/g. While a smaller amount of cumulative inter-particle void space is preferable, it is difficult to eliminate void space completely, because it occurs even when the particles simply overlap, so that the calculated cumulative inter-particle void space is always a value larger than 0 mL/g. The cumulative inter-particle void space is also affected by the particle shape.

The particles can have any of various shapes, including acicular, spindle-like, flat-acicular-like and granular. The flat-acicular-like shape is particularly preferable because overlapping of particles does not produce any void space, which results in an ideal structure with minimal dead space.

The magnetic properties of the invention metal magnetic powder most preferably satisfy the relationship of Formula (1) between saturation magnetization σs ($Am^2/kg$) and average particle volume including oxide layer V ($nm^3$):

$$\sigma s \geq 0.0185 V + 58 \quad (1).$$

Such a magnetic powder exhibits excellent saturation magnetization even if small in particle size.

It is also desirable for the invention magnetic powder to be concomitantly provided with excellent weatherability as demonstrated by a rate of decrease in saturation magnetization Δσs of 15% or less when held for 1 week in an atmosphere of a temperature of 60° C. and humidity of 90% RH.

The metal magnetic powder having these properties has very high utility for use in high-recording-density magnetic recording media.

Method of Manufacturing Metal Magnetic Powder

An ordinary method of manufacturing a metal magnetic powder can be adopted up to the stage of firing and reducing a starting powder added with sintering inhibitor. For example, iron oxy-hydroxide containing Co and sintering inhibitor is fired at a temperature of 250-700° C. by a known method to convert it to $\alpha\text{-}Fe_2O_3$ or other iron oxide. The iron oxide is then high-temperature reduced by gas-phase reduction to obtain metal magnetic powder comprised mainly of α-Fe. This metal magnetic powder is called the Post-reduction Intermediate Product in the present specification. In order to obtain the metal magnetic powder of the invention, it is necessary to subject the Post-reduction Intermediate Product to a treatment for eluting nonmagnetic constituents originating from the sintering inhibitor (elution process). Following the elution process, the metal magnetic powder is formed with an oxide layer (oxidation process) to obtain the invention metal magnetic powder.

Elution Process

Although the Post-reduction Intermediate Product to be subjected to the elution process can be one whose particle surfaces are formed with an oxide layer, it is preferable for achieving more effective elution of the constituents originating from the sintering inhibitor to use a powder not formed with an oxide layer.

The processing solution is prepared by dissolution of a compound (complexing agent) capable of forming a complex with one or more of the rare earth element (Y being treated as a rare earth element), Al and Si contained in the Post-reduction Intermediate Product. While the choice of complexing agent is not particularly limited, chemicals commonly used as complexing agent in electroless plating, e.g., tartrate, citrate, malate and lactate, are advantageous for their ready availability. The concentration of the complexing agent should be made about 0.01-10 mol/L. If necessary, a substance having a pH-buffering effect, e.g., an ammonium salt or the like, can be added to the solution. The processing solution can be prepared at around normal room temperature.

The Post-reduction Intermediate Product is added to the processing solution. Addition of an excessive amount of the powder may cause heterogeneous reaction. Good results are generally obtained when the amount added is 1-100 g, preferably 5-50 g, per liter of processing solution. The solution is preferably stirred or forcibly dispersed (such as by ultrasonic dispersion) so as to keep the reaction uniform.

Once the powder has been uniformly dispersed in the processing solution, a reducing agent is added thereto. Hydrazine ($N_2H_2$), lithium aluminum hydride ($LiAlH_4$), sodium boron hydride ($NaBH_4$) or other such substance known to exhibit strong reducing power is used as the reducing agent. Use of a reducing agent of weak reducing ability is inadvisable because it tends to cause elution of the magnetic elements. Excessively high and low reducing agent concentrations should be avoided because too high a concentration degrades the nonmagnetic constituent eluting effect and too low a concentration tends to cause elution of magnetic elements. The reducing agent concentration can usually be adjusted within the range of 0.01-10 mol/L and is preferably adjusted to 0.05-5 mol/L, more desired to 0.1-5 mol/L. Following addition of the reducing agent, leaching is performed for 10-300 min with the solution temperature held at 10-50° C., preferably 15-40° C. This elutes nonmagnetic constituents into the processing solution, thereby increasing the relative content of the magnetic elements in the magnetic powder particles. This reaction is preferably allowed to proceed in an inert gas atmosphere.

Figure 3:
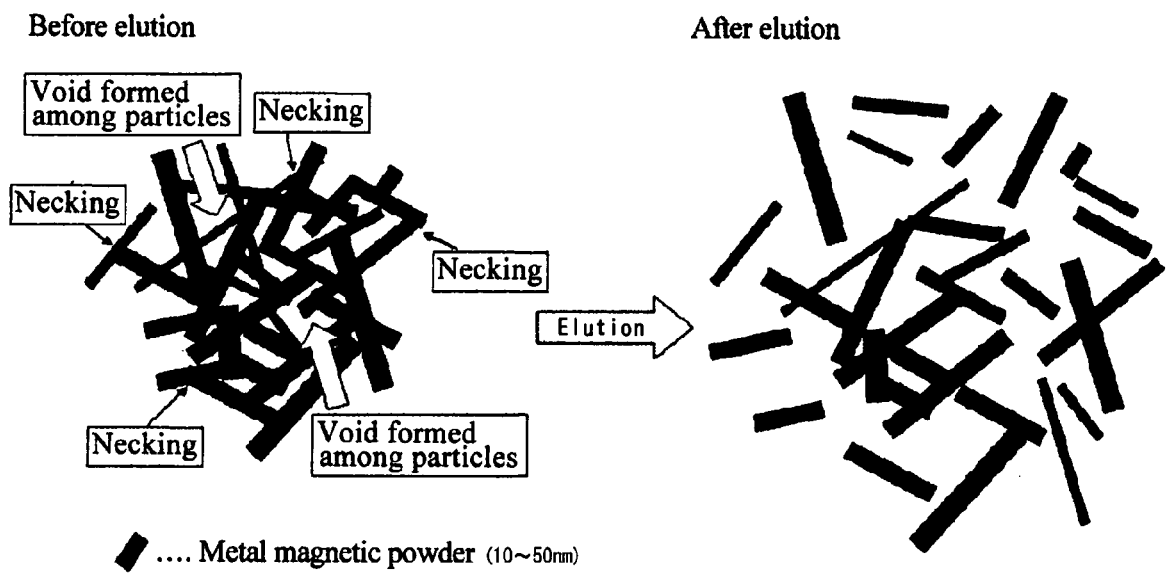
FIG. 3 is a diagram schematically representing the states of a metal magnetic powder before and after elution processing.

FIG. 3 schematically represents the states of a metal magnetic powder before and after the elution process. It is believed that in the powder before elution the sintering inhibitor causes the formation of a large number of bonds among the particles, thereby producing large voids among the particles. When many inter-particle void spaces are present, they become dead spaces within the magnetic layer so that magnetic particle packing tends to be poor. On the other hand, in the powder after elution, the dissolution and removal of the sintering inhibitor reduces the number bonds to enhance the discreteness of the particles. Packing is therefore improved (the number of magnetic particles present per unit volume of the magnetic layer is increased), so that a decrease in noise and other effects can be expected at the time of medium-making.

Oxidation Process

The metal magnetic powder that has passed through the elution process is processed to form an oxide layer on the particle surfaces. The method used is not particularly limited and a conventional method can be adopted. That is to say, the oxidation can be conducted by the wet method of casting an oxidizing agent into the solution used in the elution process or by the dry method of oxidizing powder separated/extracted from the elution processing solution. In the dry method, however, the powder is in an unstable state and must be handled with caution.

Magnetic Recording Medium

The invention metal magnetic powder obtained in this manner can be utilized for the magnetic layer of a multilayer coated-type magnetic recording medium by an ordinary method.

The multilayer coated-type magnetic recording medium has a base film, a nonmagnetic layer formed on the base film as an underlayer, and a magnetic layer formed on the nonmagnetic layer as an upper layer. The invention metal magnetic powder is blended into a coating composition for forming the upper magnetic layer.

The coating compositions for the underlayer and upper layer can both be prepared by the method of mixing the constituent materials in ratios to obtain the specified compositions and kneading/dispersing the mixtures using a kneader and sand grinder. Application of the coating compositions to the base film is preferably done by the wet-on-wet method, which applies the upper magnetic layer as soon as possible while the underlayer is still wet.

The following can be given as an example of the structural elements of the multilayer coated-type magnetic recording medium.

Base Film

As examples of the base film can be cited resin films of polyesters such as polyethylene terephthalate and polyethylene naphthalate, polyolefins, cellulose triacetate, polycarbonate, polyamide, polyimide, poly (amide-imide), polysulfone amide, and aromatic polyamide.

Coating Composition for Nonmagnetic Layer (Underlayer)

As an example of the nonmagnetic coating composition can be given one composed of 85 parts by mass of nonmagnetic powder ($\alpha$-iron oxide, product of Dowa Mining Co., Ltd., average major axis particle diameter, 80 nm), 20 parts by mass of carbon black, 3 parts by mass of alumina, 15 parts by mass of vinyl chloride resin (MR-110 vinyl chloride-base binder, product of Zeon Corp.), 15 parts by mass of polyurethane resin (UR-8200 polyurethane resin, product of Toyobo Co., Ltd.), 190 parts by mass of methyl ethyl ketone, 80 parts by mass of cyclohexanone, and 110 parts by mass of toluene.

Coating Composition for Magnetic Layer (Upper Layer)

As an example of the magnetic coating composition can be given one composed 100 parts by mass of the invention metal magnetic powder, 5 parts by mass of carbon black, 3 parts by mass of alumina, 15 parts by mass of vinyl chloride resin (MR-110, product of Zeon Corp.), 15 parts by mass of polyurethane resin (the aforesaid UR-8200), 1 part by mass of stearic acid, 1 part by mass of acetylacetone, 190 parts by mass of methyl ethyl ketone, 80 parts by mass of cyclohexanone, and 110 parts by mass of toluene.

EXAMPLES

Comparative Example 1

To 3,000 mL of pure water placed in a 5,000 ml beaker and maintained at 40° C. using a temperature controller was added 500 mL of a solution obtained by mixing a 0.03 mol/L solution of cobalt sulfate (reagent grade) and a 0.15 mol/L aqueous solution of ferrous sulfate (reagent grade) at a mixing ratio of 1:4. Next, granular sodium carbonate was directly added in an amount such that the carbonate was 3 equivalents relative to (Fe+Co) to prepare a suspension composed mainly of ferrous carbonate while controlling the liquid temperature so as not to vary exceed ±5° C. from 40° C. The suspension was ripened for 1.5 hour, added with air at the rate of 50 mL/min in an amount adjusted to make the Fe ion oxidation rate 20%, thereby forming crystal nuclei, heated to 65° C., and aerated with pure oxygen at 50 mL/min to continue oxidation for 1 hr.

The liquid temperature was then lowered to 40° C. and after the temperature stabilized, an aqueous aluminum sulfate solution of 1.0 mass % as Al was continuously added at the rate of 5.0 g/min for 20 min to grow iron oxy-hydroxide. Pure oxygen was further passed at 50 mL/min to complete oxidation. Oxidation was determined to be complete following the point when a small sample of supernatant showed no change in color on testing with potassium hexacyanoferrate.

The liquid following completion of oxidation was added with 300 g of a solution of yttrium oxide in aqueous sulfuric acid (containing 2.0 mass % as Y). By this, Al entered solid solution and an iron oxy-hydroxide powder having Y adhered to its surface was obtained.

The iron oxy-hydroxide cake was separated by ordinary filtering, washed with water and dried at 130° C. to obtain iron oxy-hydroxide in the form of a dry solid. Ten grams of the solid was placed in a bucket and fired in air at 400° C. under addition of steam at an introduction rate of 1.0 g/min (water basis), thereby affording an iron-system oxide composed mainly of $\alpha$-iron oxide (hematite).

The $\alpha$-iron oxide was placed in a gas-permeable bucket and the bucket was loaded into a penetrate-type reduction furnace. The $\alpha$-iron oxide was reduced by firing for 30 min at 400° C. with passage of hydrogen gas (flow rate: 40 L/min) and addition of steam at an introduction rate of 1.0 g/min (water basis). At the end of the reduction period, the supply of steam was terminated and the temperature was elevated to 600° C. at a temperature increase rate of 10° C./min in the presence of a hydrogen atmosphere. High-temperature reduction was then conducted for 60 min under addition of steam at an introduction rate of 1.0 g/min (water basis) to produce a metal magnetic powder (iron-system alloy powder). The metal magnetic powder at this stage had not yet been processed (oxidized) to form an oxide layer and corresponded to the aforesaid Post-reduction Intermediate Product.

Oxidation Process

In this Comparative Example, the Post-reduction Intermediate Product was formed with an oxide layer using a conventional oxidation process. Specifically, the intermediate product was transferred to the oxidation process without removing it from the bucket. That is, the atmosphere in the furnace was then changed from hydrogen to nitrogen and the furnace temperature was lowered to 90° C. at a temperature decrease rate of 20° C./min while introducing nitrogen at a flow rate of 50 L/min. At the initial stage of oxide layer formation, a mixed gas obtained by supplying nitrogen at 50 L/min and pure oxygen at 400 mL/min was added to the furnace while also adding steam at an introduction rate of 1.0 g/min (water basis), thereby forming oxide layer in a mixed atmosphere of steam, oxygen and nitrogen. At the point where heat generation by surface oxidation subsided, the amount of oxygen supplied was gradually increased to raise the oxygen concentration of the atmosphere. The final pure oxygen flow rate was made 2.0 L/min. At this time, the total amount of gas introduced into the furnace was held substantially constant by regulating the nitrogen flow rate. Stabilization was carried out in an atmosphere maintained at about 90° C.

The powder properties and composition of the metal magnetic powder (after oxidation) obtained in this manner were examined as set out below.

Measurement of Major Axis Length and Minor Axis Length

A JEM-100CX MARK-II Transmission Electron Microscope (product of JEOL) was used at an acceleration voltage of 100 kV to observe a bright-field image of the powder to be measured. The observed image was photographed at a magnification of, say, 58000× and enlarged at a magnification of, say, 9× in both width and length. For each sample, 300 particles were selected at random from among mono-dispersed particles in a number of photographic images, and the major axis length and minor axis length appearing in the photographic images were measured for each selected particle. The averages of the measured major and minor axis lengths were respectively defined as the major axis length and minor axis length of the sample.

Particle Volume

The average values of the major axis length and minor axis length measured in the foregoing manner were used to calculate particle volume by cylindrical approximation in accordance with the following equation:

$$(\text{Particle volume}) = \pi \times (\text{Major axis length}) \times (\text{Minor axis length}/2)^2$$

Specific Surface Area

Specific surface area was determined by the BET method using a Quadrasorb US instrument (product of Yuasa-Ionics).

Crystallite Size

Crystallite size was calculated from the following Formula (5) using data obtained with an X-ray diffractometer (Rigaku RAD-2C):

$$\text{Crystallite size} = K\lambda/\beta \cos\theta \quad (5),$$

where K is the Scherrer constant=0.9, $\lambda$ is the wavelength of the Co-K$\alpha$ X-ray emission line, $\beta$ is the half-value of the Fe(110) diffraction peak (radian), and $\theta$ is the diffraction angle (radian).

The measurement range scanned for the calculation was $2\theta=45$-$60°$. The scanning speed was 5°/min and the number of integrations was 5.

Magnetic Properties and Weatherability

The magnetic properties of the powder were measured under a 10 kOe (795.8 kA/m) external magnetic field using a VSM-7P vibrating sample magnetometer (product of Toei-Kogyo Co., Ltd.). The sample powder was stored for one week in a thermohygrostat at a temperature of 60° C. and humidity of 90% RH, the change in the saturation magnetization $\Delta\sigma s$ before and after storage in the thermohygrostat was measured, and the weatherability of the powder was calculated in accordance with Formula (4).

Composition Analysis of Powder Particles

The composition of the powder particles was determined by performing mass analysis on the entire particle including both the metal magnetic phase and the oxide layer. Determination of Co, Al and rare earth element (Y being treated as a rare earth element) was done using an Iris/AP High-frequency Inductively Coupled Plasma Spectrometer (product of Jarrell Ash Japan), Fe determination was done using a Hiranuma Automatic Titrator (COMTIME-980; product of Hiranuma Sangyo Co., Ltd.), and oxygen determination was done using a Nitrogen/Oxygen Determinator (TC-436; product of LECO Corporation). As the determination results were obtained in mass percent, they were suitably converted to atomic percent (at. %) to obtain the Co/Fe atomic ratio, Al/(Fe+Co) atomic ratio, Y/(Fe+Co) atomic ratio, and (R+Al+Si)/(Fe+Co) atomic ratio. In the Comparative Examples and Examples, Si/(Fe+Co) was below the measurement limit, so that in these examples (R+Al+Si)/(Fe+Co) atomic ratio was the same as (R+Al)/(Fe+Co) atomic ratio.

The results are shown in Table 1 (along with those for the Comparative Examples set out below).

Comparative Examples 2-24

A manufacturing method like that of Comparative Example 1 was used to produce powders of various compositions and particle sizes by varying the composition and oxidation conditions.

The compositions and magnetic properties of the samples obtained are shown in Table 1.

Example 1

A Post-reduction Intermediate Product was produced by a manufacturing method like that of Comparative Example 1. The product obtained by subjecting the Post-reduction Intermediate Product to the "oxidation process" set out in Comparative Example 1 was designated Pre-elution Sample 1. The powder properties and magnetic properties of the Pre-elution Sample 1 were determined by the same methods as in Comparative Example 1. The results are shown in Table 2 (along with those for Pre-elution Samples 2 and 3 set out below).

The metal magnetic powder before the Pre-elution Sample 1 was oxidized, i.e., the Post-reduction Intermediate Product, was subjected to elution in the following manner.

A mixture containing 0.05 mol/L of disodium tartrate as complexing agent and 0.1 mol/L of ammonium sulfate as buffer was adjusted to pH 9 with $NH_3$ to prepare a processing solution. 10 g of the Pre-elution Sample 1 metal magnetic powder was cast into the processing solution, which was maintained at 30° C., followed by addition of sodium tetrahydroborate as reducing agent to a concentration of 0.3 mol/L. The result was ripened at 30° C. for 30 min under stirring to obtain a slurry. The slurry was subjected to solid-liquid separation to obtain a solids component and a filtrate.

The solids component was filtered, washed with water and dried to obtain a dry product. The dry product was oxidized under oxidation conditions similar to those shown in Comparative Example 1 to obtain Example 1 Metal Magnetic Powder. The powder properties and composition of the Example 1 Metal Magnetic Powder were examined in the manner of Comparative Example 1.

On the other hand, the filtrate was measured for the concentration (ppm) of Fe, Co, Al and Y as components eluted from the powder.

The results are shown in Table 2 (along with those for the Examples set out below). "Example 1 Metal Magnetic Powder" is abbreviated to "Example 1" in Table 2. Similar abbreviations are used with regard to the Examples set out below. The terms "Major axis length" and "Minor axis length" appearing in Table 2 mean "Average major axis length" and "Average minor axis length," respectively.

Next, Pre-elution Sample 1 and Example 1 Metal Magnetic Powder were used to fabricate magnetic tapes by the following method and the tapes were tested for their magnetic properties as recording media. In order to more clearly ascertain the effects of the metal magnetic powders, the tapes were fabricated to have only a magnetic layer, without provision of a nonmagnetic layer.

(1) Magnetic Coating Composition Preparation

Magnetic powder, 0.35 g, was weighed out and placed in a pot (inside diameter: 45 mm, depth: 13 mm) and allowed to stand for 10 min. with the cover open. Next, 0.700 mL of a vehicle [mixed solution of vinyl chloride resin MR-110 (22 mass %, product of Zeon Corp.), cyclohexanone (38.7 mass %), acetylacetone (0.3 mass %), n-butyl stearate (0.3 mass %) and methyl ethyl ketone (38.7 mass %)] was added to the pot using a micropipette. A 30 g steel ball (2φ) and ten nylon balls (8φ) were immediately added to the pot and the pot was covered and allowed to stand for 10 min. The pot was then set in a centrifugal ball mill (Fritsch P-6) and the rotating speed was gradually raised to 600 rpm, at which dispersion was continued for 60 min. The centrifugal ball mill was stopped and the pot removed. Using a micropipette, the pot was added with 1.800 mL of a liquid adjuster prepared in advance by mixing methyl ethyl ketone and toluene at a ratio of 1:1. The pot was again set in the centrifugal ball mill and rotated at 600 rpm for 5 minutes. This completed the dispersion.

(2) Magnetic Tape Preparation

Upon completion of the foregoing dispersion, the cover of the pot was opened and the nylon balls removed. The coating composition, together with the steel ball, was placed in an applicator (55 μm) and coated onto a base film (15 μm polyethylene film marketed by Toray Industries under the product designation 15C-B500). The coated film was promptly placed at the center of the coil of a 5.5 kG magnetic orientation device to orient its magnetic field, and then dried.

(3) Tape Property Evaluation

The coercive force Hcx, switching field distribution SFD, squrareness ratio SQ and orientation ratio OR of the obtained tapes were measured using the aforesaid VSM.

The properties of the obtained tapes are shown in Table 3.

Next, the pore size distribution of the metal magnetic powders of Pre-elution Sample 1 and Example 1 Metal Magnetic Powder were measured as set out below.

Pore Size Distribution

Pore size distribution was measured by the mercury penetration method using a pore distribution porosity meter (AutoPore IV 9500 V1.05, product of Micrometrics Instrument Corporation).

The aforesaid "cumulative inter-particle void space" was calculated from the pore size distribution and the value of the average major axis length. A powder that had a "cumulative inter-particle void space" value of less than 1.0 mL/g was rate G (Good) and one that had a value of 1.0 mL/g or greater was rated P (Poor, i.e. of the conventional level). The results are shown in Table 3 (along with those for the Examples set out below).

Example 2

The metal magnetic powder before the Pre-elution Sample 1 was oxidized, i.e., the Post-reduction Intermediate Product, was subjected to elution under the following conditions.

A mixture containing 0.05 mol/L of sodium citrate as complexing agent and 0.1 mol/L of ammonium sulfate as buffer was adjusted to pH 9 with $NH_3$ to prepare a processing solution. 10 g of the Pre-elution Sample 1 metal magnetic powder was cast into the processing solution, which was maintained at 30° C., followed by addition of hydrazine as reducing agent to a concentration of 4 mol/L. The result was ripened at 30° C. for 30 min under stirring to obtain a slurry. The slurry was subjected to solid-liquid separation and the properties of the metal magnetic powder were examined in the manner of Example 1.

Example 3

A Post-reduction Intermediate Product differing in composition from the Pre-elution Sample 1 was produced by a method similar to that described in Comparative Example 1. The result was subjected to the "oxidation process" of Comparative Example 1 to obtain a "Pre-elution Sample 2."

The metal magnetic powder before the Pre-elution Sample 2 was oxidized, i.e., the Post-reduction Intermediate Product, was subjected to elution under the conditions of Example 1. The slurry was subjected to solid-liquid separation and the properties of the metal magnetic powder were examined in the manner of Example 1.

Example 4

The metal magnetic powder before the Pre-elution Sample 2 was oxidized, i.e., the Post-reduction Intermediate Product, was subjected to elution under the conditions of Example 2. The slurry was subjected to solid-liquid separation and the properties of the metal magnetic powder were examined in the manner of Example 1.

Example 5

A Post-reduction Intermediate Product differing in composition from the Pre-elution Samples 1 and 2 was produced by a method similar to that described in Comparative Example 1. The result was subjected to the oxidation process of Comparative Example 1 to obtain a "Pre-elution Sample 3."

The metal magnetic powder before the Pre-elution Sample 3 was oxidized, i.e., the Post-reduction Intermediate Product, was subjected to elution under the following conditions.

A processing solution was prepared as a mixture containing 0.0028 mol/L of disodium tartrate as complexing agent and 0.0056 mol/L of ammonium sulfate as buffer. 10 g of the Pre-elution Sample 3 metal magnetic powder was cast into the processing solution, which was maintained at 30° C., followed by addition of sodium boron hydride as reducing agent to a concentration of 0.004 mol/L. The result was ripened at 30° C. for 30 min under stirring to obtain a slurry. The slurry was subjected to solid-liquid separation and the properties of the metal magnetic powder were examined in the manner of Example 1.

TABLE 1

| No. | Major axis length (nm) | Minor axis length (nm) | Average particle volume V ($nm^3$) | BET Specific surrace area ($m^2/g$) | Crystallite size (nm) | Saturation magnetization σs ($Am^2/kg$) | Coercive force Hc (kA/m) | Weatherability Δσs (%) |
|---|---|---|---|---|---|---|---|---|
| Comparative Example 1 | 36.1 | 10.4 | 3067 | 73 | 11 | 109 | 172.3 | 9 |
| Comparative Example 2 | 33.9 | 8.7 | 2015 | 97 | 8 | 89 | 154.4 | 11 |
| Comparative Example 3 | 34.9 | 9.5 | 2474 | 91 | 9 | 95 | 159.6 | 13 |
| Comparative Example 4 | 35.1 | 10.2 | 2868 | 74 | 10 | 107 | 142.0 | 9 |

TABLE 1-continued

| | | | | | | | | |
|---|---|---|---|---|---|---|---|---|
| Comparative Example 5 | 37.0 | 10.0 | 2906 | 73 | 11 | 106 | 168.3 | 9 |
| Comparative Example 6 | 37.5 | 10.2 | 3064 | 74 | 11 | 108 | 163.9 | 9 |
| Comparative Example 7 | 37.0 | 9.9 | 2848 | 80 | 9 | 100 | 177.5 | 13 |
| Comparative Example 8 | 35.4 | 9.8 | 2670 | 84 | 9 | 102 | 168.7 | 13 |
| Comparative Example 9 | 37.0 | 11.0 | 3516 | 67 | 11 | 119 | 174.7 | 10 |
| Comparative Example 10 | 45.8 | 11.1 | 4432 | 70 | 12 | 116 | 192.2 | 10 |
| Comparative Example 11 | 44.8 | 10.2 | 3661 | 75 | 10 | 109 | 175.5 | 10 |
| Comparative Example 12 | 46.7 | 11.3 | 4683 | 68 | 12 | 123 | 196.2 | 8 |
| Comparative Example 13 | 43.7 | 9.7 | 3229 | 78 | 10 | 103 | 179.0 | 11 |
| Comparative Example 14 | 46.1 | 10.1 | 3693 | 75 | 10 | 107 | 180.2 | 10 |
| Comparative Example 15 | 46.2 | 10.3 | 3850 | 75 | 10 | 109 | 177.5 | 10 |
| Comparative Example 16 | 43.7 | 9.7 | 3229 | 78 | 10 | 103 | 179.0 | 11 |
| Comparative Example 17 | 46.8 | 11.0 | 4448 | 73 | 11 | 107 | 184.6 | 6 |
| Comparative Example 18 | 44.6 | 10.8 | 4086 | 75 | 11 | 108 | 187.0 | 11 |
| Comparative Example 19 | 45.2 | 10.9 | 4218 | 74 | 11 | 111 | 187.8 | 11 |
| Comparative Example 20 | 45.5 | 10.9 | 4246 | 73 | 11 | 113 | 188.6 | 10 |
| Comparative Example 21 | 43.2 | 12.1 | 4968 | 58 | 13 | 120 | 187.4 | 6 |
| Comparative Example 22 | 46.4 | 11.0 | 4410 | 70 | 11 | 113 | 195.8 | 11 |
| Comparative Example 23 | 46.9 | 10.3 | 3908 | 75 | 11 | 110 | 176.7 | 10 |
| Comparative Example 24 | 43.7 | 10.0 | 3432 | 75 | 11 | 110 | 172.7 | 12 |

| | Atomic ratio *1 | | | | (R + Al + Si) per unit surface area (μmol/m²) |
|---|---|---|---|---|---|
| No. | Co/Fe (at %) | Al/(Fe + Co) (at %) | Y/(Fe + Co) (at %) | (R + Al + Si)/(Fe + Co) (at %) | |
| Comparative Example 1 | 24 | 14.8 | 15.0 | 29.8 | 70.9 |
| Comparative Example 2 | 27 | 19.8 | 12.3 | 32.1 | 57.2 |
| Comparative Example 3 | 27 | 19.8 | 12.3 | 32.1 | 61.0 |
| Comparative Example 4 | 24 | 14.8 | 15.0 | 29.8 | 70.0 |
| Comparative Example 5 | 24 | 14.8 | 15.0 | 29.8 | 70.9 |
| Comparative Example 6 | 24 | 13.1 | 12.8 | 25.9 | 60.7 |
| Comparative Example 7 | 24 | 18.3 | 12.1 | 30.4 | 65.7 |
| Comparative Example 8 | 24 | 20.1 | 11.8 | 31.9 | 65.5 |
| Comparative Example 9 | 24 | 13.1 | 12.8 | 25.9 | 67.0 |
| Comparative Example 10 | 24 | 14.4 | 7.8 | 22.2 | 54.7 |
| Comparative Example 11 | 24 | 14.4 | 7.8 | 22.2 | 51.0 |
| Comparative Example 12 | 24 | 13.1 | 7.8 | 20.9 | 53.0 |
| Comparative Example 13 | 24 | 14.4 | 12.5 | 26.9 | 59.7 |
| Comparative Example 14 | 24 | 14.4 | 12.5 | 26.9 | 62.1 |
| Comparative Example 15 | 24 | 14.4 | 7.8 | 22.2 | 51.0 |
| Comparative Example 16 | 24 | 14.4 | 12.5 | 26.9 | 59.7 |
| Comparative Example 17 | 24 | 14.4 | 7.8 | 22.2 | 52.4 |
| Comparative Example 18 | 24 | 14.4 | 7.8 | 22.2 | 51.0 |
| Comparative Example 19 | 24 | 14.4 | 7.8 | 22.2 | 51.7 |
| Comparative Example 20 | 24 | 14.4 | 7.8 | 22.2 | 52.4 |
| Comparative Example 21 | 24 | 10.5 | 12.7 | 23.2 | 69.5 |
| Comparative Example 22 | 24 | 13.1 | 12.5 | 25.6 | 63.4 |
| Comparative Example 23 | 24 | 14.4 | 7.8 | 22.2 | 51.0 |
| Comparative Example 24 | 24 | 10.2 | 12.5 | 22.7 | 52.7 |

*1 R: Rare earth element (Y being treated as a rare earth element)

TABLE 2

| No. | Major axis length (nm) | Minor axis length (nm) | Average particle volume V (nm³) | BET Specific surface area (m²/g) | Crystal-lite size (nm) | Saturation magnetization σs (Am²/kg) | Coercive force Hc (kA/m) | Weather-ability Δσs (%) | Atomic ratio *1 | | | |
|---|---|---|---|---|---|---|---|---|---|---|---|---|
| | | | | | | | | | Co/Fe (at %) | Al/(Fe + Co) (at %) | Y/(Fe + Co) (at %) | (R + Al + Si)/(Fe + Co) (at %) |
| Pre-elution Sample 1 | 38.5 | 11.6 | 4100 | 90 | 10.2 | 101 | 144.3 | 15 | 24 | 12.5 | 11.9 | 24.4 |
| Example 1 | 29.9 | 9.4 | 2075 | 84 | 10.1 | 108 | 129.6 | 13 | 24 | 5.9 | 5.8 | 11.7 |
| Example 2 | 30.4 | 9.8 | 2293 | 74 | 10.1 | 114 | 141.0 | 10 | 24 | 5.0 | 5.1 | 10.1 |
| Pre-elution Sample 2 | 44.0 | 11.3 | 4413 | 81 | 11.3 | 108 | 173.6 | 15 | 24 | 13.1 | 8.2 | 21.3 |
| Example 3 | 36.7 | 9.6 | 2656 | 73 | 11.3 | 117 | 162.6 | 9 | 24 | 6.1 | 4.0 | 10.1 |
| Example 4 | 36.0 | 9.7 | 2660 | 77 | 11.0 | 112 | 156.0 | 9 | 24 | 6.3 | 4.2 | 10.5 |
| Pre-elution 3 | 38.2 | 11.0 | 3630 | 103 | 9.5 | 87 | 152.2 | 15 | 24 | 17.6 | 11.2 | 28.8 |
| Example 5 | 30.9 | 9.4 | 2144 | 93 | 9.5 | 106 | 155.0 | 15 | 24 | 6.2 | 6.9 | 13.1 |

TABLE 2-continued

|  | (R + Al + Si) per unit surface area (μmol/m²) | (R + Al + Si) reduction ratio (%) | Concentration of components eluted into filtrate | | | |
|---|---|---|---|---|---|---|
| No. | | | Fe (ppm) | Co (ppm) | Al (ppm) | Y (ppm) |
| Pre-elution Sample 1 | 47.0 | — | — | — | — | — |
| Example 1 | 24.1 | 48.6 | 40 | 5 | 200 | 620 |
| Example 2 | 11.5 | 75.6 | 50 | 6 | 220 | 710 |
| Pre-elution Sample 2 | 45.3 | — | — | — | — | — |
| Example 3 | 23.8 | 47.5 | 40 | 5 | 200 | 400 |
| Example 4 | 13.9 | 69.2 | 50 | 5 | 200 | 410 |
| Pre-elution 3 | 29.5 | — | — | — | — | — |
| Example 5 | 17.2 | 41.5 | 10 | 7 | 340 | 410 |

*1 R: Rare earth element (Y being treated as a rare earth element)

TABLE 3

| No. | Cumulative inter-particle void space *1 | Tape properties | | | | |
|---|---|---|---|---|---|---|
| | | Hc (kA/m) | (Oe) | SFD | SQ | OR |
| Pre-elution Sample 1 | P | 171.3 | 2152 | 0.83 | 0.80 | 2.00 |
| Example 1 | G | 184.2 | 2315 | 0.70 | 0.83 | 2.70 |
| Example 2 | G | 194.6 | 2445 | 0.72 | 0.81 | 2.50 |
| Pre-elution Sample 2 | P | 203.2 | 2553 | 0.57 | 0.85 | 2.30 |
| Example 3 | G | 218.9 | 2751 | 0.50 | 0.86 | 2.70 |
| Example 4 | G | 217.1 | 2728 | 0.47 | 0.87 | 2.70 |
| Pre-elution Sample 3 | P | 177.3 | 2228 | 0.76 | 0.79 | 2.00 |
| Example 5 | G | 198.1 | 2490 | 0.62 | 0.85 | 2.70 |

*1 G (Good): Less than 1.0 mL/g
P (Poor): 1.0 mL/g or greater

It will be noted that in the metal magnetic powders indicated as Examples, the elution carried out on the powders markedly reduced the content of nonmagnetic constituents (Y, Al) originating from the sintering inhibitor. The amounts of Fe and Co washed out by the elution were slight in comparison with the amounts of Al and Y. This demonstrates that the amounts of the nonmagnetic constituents contained could be reduced selectively and efficiently.

FIG. 1 shows how saturation magnetization σs varied as a function of average particle volume V. It can be seen that the elution carried out on the invention metal magnetic powders obtained in the Examples enabled them to satisfy Formula (1) and to achieve greatly improved saturation magnetization σs for their small size in comparison with the metal magnetic powders of the Comparative Examples. In other words, it was found that the invention can provide a metal magnetic powder for use in magnetic recording media that is improved in the relationship between its particle size and its magnetic properties. In addition, the weatherability of the invention metal magnetic powder, judged based on the rate of decrease in saturation magnetization Δσs, was excellent and on a par with or superior to the conventional level.

As shown in Table 3, the powders of the Examples after completion of elution were reduced in cumulative inter-particle void space to less than 1.0 mL/g and were found to have concomitantly achieved a marked improvement in magnetic properties. This is believed to be attributable to the fact that the orientation property in the medium was improved owing to elimination of inter-particle necking on a major scale.

Figure 2:
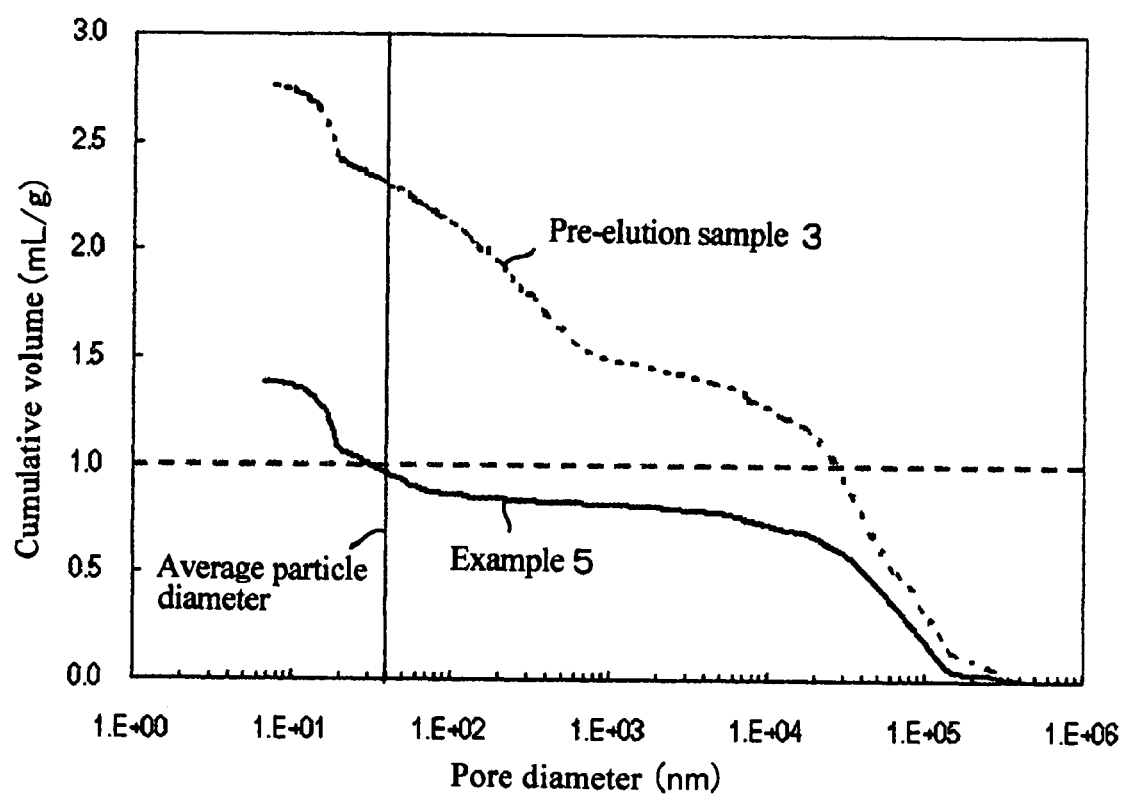
FIG. 2 is a pore size distribution graph (with cumulative volume scaled on the vertical axis) for the metal magnetic powders of pre-elution Sample 3 and Example 5.

FIG. 2 is a pore size distribution graph (with cumulative volume scaled on the vertical axis) showing plots for the metal magnetic powders of Pre-elution Sample 3 and Example 5.

What is claimed is:

1. A metal magnetic powder for a magnetic recording medium, wherein particles of the powder have a metal magnetic phase, composed mainly of Fe or Fe plus Co, and an oxide layer on a surface of the particle, wherein the average major axis length of the powder particles is 10-50 nm, the average particle volume including the oxide layer is 5,000 nm³ or less, and the atomic ratio (R+Al+Si)/(Fe+Co) calculated using the content values (at. %) of the elements contained in the powder particles is 20% or less, where R is rare earth element (Y being treated as a rare earth element), and the metal magnetic powder satisfies the relationship of Formula (1) between saturation magnetization σs (Am²/kg) and average particle volume including the oxide layer V (nm³):

$$\sigma s \geq 0.0185V + 58 \tag{1}$$

2. The metal magnetic powder for a magnetic recording medium according to claim 1, wherein the total content of rare earth element (Y being treated as a rare earth element), Al and Si in the powder particles is not greater than 40 μmol/m² per unit surface area of the powder.

3. The metal magnetic powder for a magnetic recording medium according to claim 1, wherein when a pore size distribution of the magnetic powder is measured by the mercury penetration method, the metal magnetic powder has such relationship that the cumulative volume of pores in the region where the pore size is larger than the average major axis length of the power is 1.0 mL/g or less.

4. The metal magnetic powder for a magnetic recording medium according to claim 1, wherein a rate of decrease in saturation magnetization Δσs of the metal magnetic powder when held for 1 week in an atmosphere of a temperature of 60° C. and humidity of 90% RH is 15% or less.

5. A magnetic recording medium including the metal magnetic powder according to claim 1.

6. The metal magnetic powder for a magnetic recording medium according to claim 2, wherein when a pore size distribution of the magnetic powder is measured by the mercury penetration method, the metal magnetic powder has such relationship that the cumulative volume of pores in the region where the pore size is larger than the average major axis length of the power is 1.0 mL/g or less.

7. The metal magnetic powder for a magnetic recording medium according to claim 2, wherein a rate of decrease in saturation magnetization Δσs of the metal magnetic powder when held for 1 week in an atmosphere of a temperature of 60° C. and humidity of 90% RH is 15% or less.

8. The metal magnetic powder for a magnetic recording medium according to claim 3, wherein a rate of decrease in saturation magnetization $\Delta\sigma s$ of the metal magnetic powder when held for 1 week in an atmosphere of a temperature of 60° C. and humidity of 90% RH is 15% or less.

9. A magnetic recording medium including the metal magnetic powder according to claim 2.

10. A magnetic recording medium including the metal magnetic powder according to claim 3.

11. A magnetic recording medium including the metal magnetic powder according to claim 4.

* * * * *